US00RE38531E

(19) United States
(12) Reissued Patent
Berenguer

(10) Patent Number: US RE38,531 E
(45) Date of Reissued Patent: Jun. 8, 2004

(54) TETRAKISAZO DYES, THEIR PRODUCTION AND USE

(75) Inventor: Jordi Berenguer, El Prat de Llobregat (ES)

(73) Assignee: Clariant Finance (BVI) Limited, Tortola (VG)

(21) Appl. No.: 10/108,079

(22) PCT Filed: Sep. 8, 1997

(86) PCT No.: PCT/IB97/01063

§ 371 (c)(1),
(2), (4) Date: Mar. 8, 1999

(87) PCT Pub. No.: WO98/10021

PCT Pub. Date: Mar. 12, 1998

Related U.S. Patent Documents

Reissue of:
(64) Patent No.: 6,043,349
Issued: Mar. 28, 2000
Appl. No.: 09/254,519
Filed: Mar. 8, 1999

(30) Foreign Application Priority Data

Sep. 9, 1996 (GB) ..... 9618779

(51) Int. Cl.[7] ..... C09B 35/60; C09B 35/62; C09B 67/22; D06P 3/32

(52) U.S. Cl. ..... 534/678; 534/582; 534/743; 534/754; 534/806; 534/DIG. 1; 8/437; 8/641

(58) Field of Search ..... 534/678, 743, 534/754, 806; 8/437, 641

(56) References Cited

U.S. PATENT DOCUMENTS 4,479,906 A * 10/1984 Zeidler et al. ..... 534/680
4,784,668 A * 11/1988 Breitschaft et al. ..... 106/31.48
4,816,034 A * 3/1989 Bhatt et al. ..... 8/641

FOREIGN PATENT DOCUMENTS

| | | | |
|---|---|---|---|
| DE | 2254835 | * | 5/1974 |
| DE | 2416670 | * | 10/1975 |
| EP | 253932 | * | 1/1998 |
| FR | 2379579 | * | 9/1978 |

OTHER PUBLICATIONS

K. Venkataraman, The Chemistry of Synthetic Dyes, vol. I; Chapter XV Trisazo and Polykisazo Dyes, pp. 570–579, 1952.

Technical Industrial Intelligence Division, U.S. Department of Commerce; Field Information Agency Technical (FIAT) Final Report No. 1313, German Dyestuffs and Dyestuff Intermediates Including Manufacturing Processes, Plant Design and Research Data, vol. I, pp. 20–22, Feb. 1, 1948.

Technical Industrial Intelligence Division, U.S. Department of Commerce; Field Information Agency Technical (FIAT) Final Report No. 1313, German Dyestuffs and Dyestuff Intermediates Including Manufacturing Processes, Plant Design and Research Data, vol. III, pp. 199–201, Feb. 1, 1948.

* cited by examiner

*Primary Examiner*—Flona T. Powers
(74) *Attorney, Agent, or Firm*—Anthony A. Bisculca

(57) ABSTRACT

Tetrakisazo dyes of formula (I), as defined in claim 1, optionally in admixture with trisazo dyes of formula (X) as defined in claim 4, are valuable anionic dyes for the dyeing of substrates dyeable with anionic dyes, in particular for the dyeing of leather in very intense dark shades.

15 Claims, No Drawings

TETRAKISAZO DYES, THEIR PRODUCTION AND USE

Matter enclosed in heavy brackets [ ] appears in the original patent but forms no part of this reissue specification; matter printed in italics indicates the additions made by reissue.

The invention relates to defined tetrakisazo dyes and mixtures thereof with defined trisazo dyes, their production and their use, especially for the dyeing of leather.

In U.S. Pat. No. 4,479,906 there are described trisazo dyes of the formula

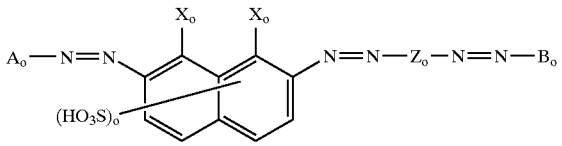

there being described in particular also some tetrakisazo dyes in which in the above formula n is 2, the two sulpho groups are in the positions meta to each $X_O$ (as corresponds to H-acid), $Z_O$ is a radical of formula (2). $A_O$ is the radical of an aminoazobenzene diazocomponent and $B_O$ is the radical of certain aminobenzene coupling components. These dyes are described also for the dyeing of leather in green to black shades.

It has now been found that tetrakisazo dyes of the below indicated structure of formula (I) are particularly valuable anionic dyes for obtaining dyeings of intensive dark shades, in particular for the penetration dyeing of leather in dark shades of high fastnesses, especially when combined with the below defined trisazo dyes of formula (X).

The invention relates to the defined dyes and dye mixtures, their production and their use.

The invention, thus, provides a tetrakisazo dye of formula

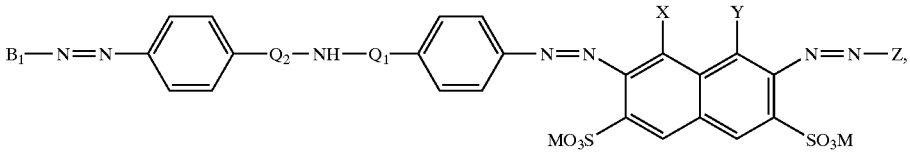

(I)

in which $A_O$ is the radical of an aromatic-carbocyclic diazo component, $B_O$ is the radical of a coupling component which contains hydroxyl and/or amino groups, n is the integer 1 or 2, one $X_O$ is hydroxyl and the other $X_O$ is amino, $Z_O$ is

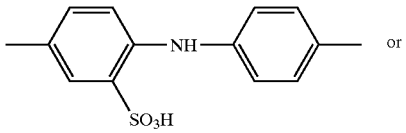

(1)

or

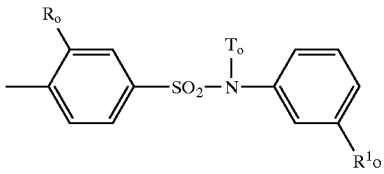

(2)

$T_O$ is hydrogen, methyl, ethyl, benzyl, β-hydroxyethyl, β-hydroxypropyl, β-cyanoethyl, β-carboxyethyl or β-carbalkoxyethyl of a total of two to five carbon atoms, $R_O$ is hydrogen, hydroxyl, chloro, bromo, nitro, methyl, ethyl or carboxyl and $R^1{}_O$ is hydrogen, methyl, ethyl, chloro, bromo, cyano, nitro, hydroxysulphonyl, carboxyl or alkoxycarbonyl, wherein one of the two symbols X and Y signifies —OH and the other signifies —$NH_2$, Z signifies a radical of formula $$—W_1—N=N—B_2 \quad (\alpha)$$

or, if Y signifies —OH, also a radical of formula $$—W_2—N=N—D \quad (\beta),$$

$Q_1$ signifies —$SO_2$— or —CO—, $Q_2$ signifies the direct bond or, if $Q_1$ is —$SO_2$—, also a group —$SO_2$—, $B_1$ signifies the radical of a coupling component H—$B_1$, $B_2$ signifies the radical of a coupling component H—$B_2$, D signifies the radical of a diazo component D—$NH_2$, $W_1$ signifies the radical of a bicyclic bisdiazo component, $W_2$ signifies the radical of a bicyclic middle component and M signifies hydrogen or a cation, or a mixture of two or more tetrakisazo dyes of formula (I).

Formula (I) comprises in particular the following formulae (Ia)

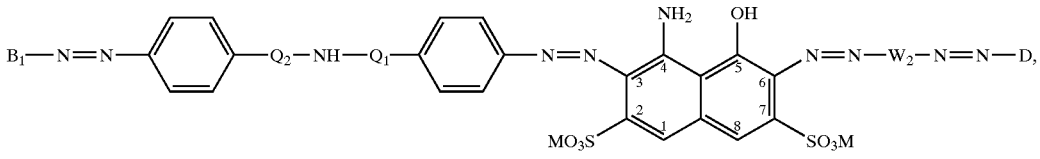

(Ib)

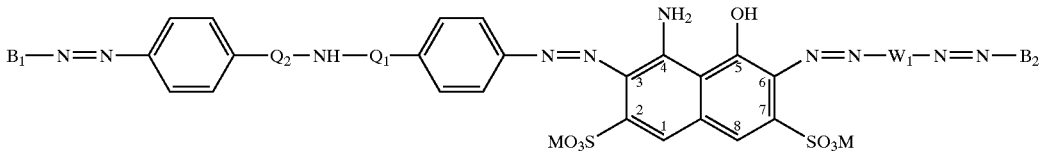

and (Ic)

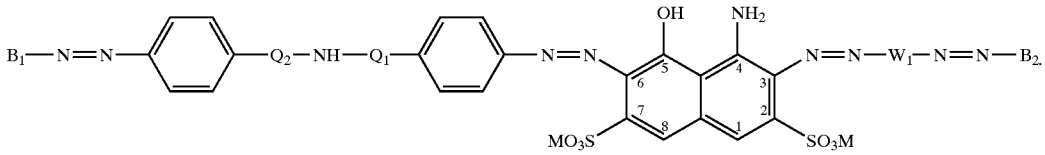

Thus, the invention provides in particular a dye of formula (Ia), (Ib) or (Ic) or a mixture of two or more thereof.

A particular further feature of the invention is represented by a mixture of at least one dye of the above formula (I) and at least one trisazo dye of formula (X)

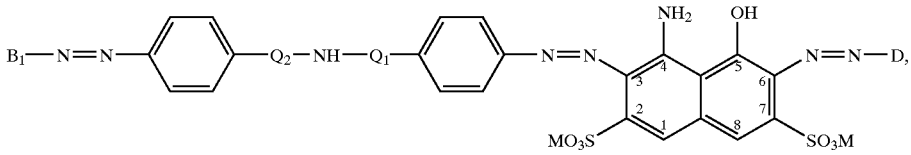

in which $B_1$, D, $Q_1$, $Q_2$ and M have the significances indicated above for formula (I).

The dyes of the invention may be produced by means of diazotization and coupling reactions, in order to form the azo groups, in a manner conventional per se. In particular, a process for the production of the tetrakisazo dyes of the invention is characterized in that for the production of a dye of formula (Ia) the bisdiazocompound of a diamine of formula (II)

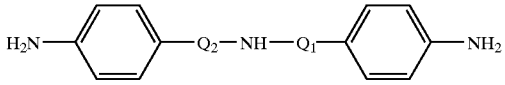

is coupled at one side to the 3-position of a bis-coupling component of formula (III)

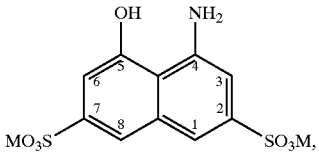

the obtained azodiazocompound is either first coupled to a coupling component H—$B_1$, to give an intermediate of formula (IV)

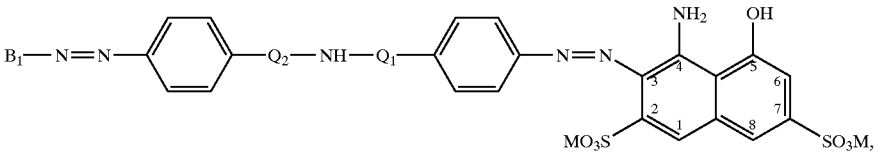

and the diazocompound of an amine of formula $$D—N=N—W_2—NH_2 \quad (V)$$

is coupled to the 6-position of the intermediate of formula (IV), or the azodiazocompound is first coupled in the 6-position with the diazocompound of an amine of formula (V) and then coupled to a coupling component $H—B_1$, for the production of a dye of formula (Ib) the bisdiazocompound of a diamine of formula (II) is coupled at one side to the 3-position of a bis-coupling component of formula (III) and the obtained azodiazocompound is either first coupled to a coupling component $H—B_1$, to give an intermediate of formula (IV), and then the bisdiazocompound of a diamine of formula $$H_2N—W_1—NH_2 \quad (VI)$$

is coupled at one side to the 6-position of the intermediate of formula (IV) and the obtained trisazodiazocompound is coupled to a coupling component $H—B_2$, or the azodiazocompound is first coupled in the 6-position with the bisdiazocompound of a diamine of formula (VI) and then the obtained disazobisdiazocompound is coupled to coupling components $H—B_1$, and $H—B_2$ or for the production of a dye of formula (Ic) the bisdiazocompound of a diamine of formula (VI) is coupled at one side to the 3-position of a bis-coupling component of formula (III) and the obtained azodiazocompound is either first coupled to a coupling component $H—B_2$ to give an intermediate of formula (VII)

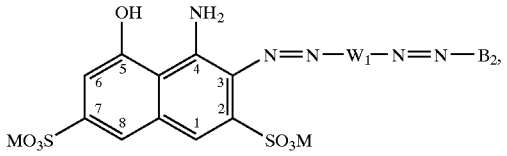

and then the bisdiazocompound of a diamine of formula (II) is coupled at one side to the 6-position of the intermediate of formula (VII) and the obtained trisazodiazocompound is coupled to a coupling component $H—B_1$, or it is first coupled in the 6-position with the bisdiazocompound of a diamine of formula (II) and then the obtained disazobisdiazocompound is coupled to $H—B_1$, and $H—B_2$.

The compounds of formula (V) may be produced by coupling the diazocompound of a diazocomponent of formula $$D—NH_2 \quad (VIII)$$

to a middle component of formula (IX)

$$H—W_2—NH_2 \quad (IX).$$

The trisazo dyes of formula (X) may be synthetized by coupling the diazocompound of a diazocomponent of formula (VIII) to a compound of formula (IV) or to its precursor azodiazocompound, before coupling of the diazoazocompound to $H—B_1$. If the starting compounds are the same as the corresponding ones employed for the production of the dyes of formula (I), this reaction sequence may be carried out together with the production of the tetrakisazo dye or dye mixture, choosing the molar ratios in a suitable way.

In the mixtures of tetrakisazo dyes of formula (I) and trisazodyes of formula (X) the molar ratio of tetrakisazo dye or tetrakisazo dye mixture to trisazo dye or trisazo dye mixture is e.g. in the range of 95/5 to 20/80, prferably 80/20 to 30/70, more preferably 75/25 to 40/60.

As diazocomponents of formula (VIII) there may be employed any known diazotizable amines, in particular of the benzene of naphthalene series, preferably containing at least one solubilizing substituent, which preferably is a sulpho group, a carboxy group, a carbamoyl group and/or a sulphamoyl group.

As diazo components of formula (VIII) come, in particular, into consideration those of the following formulae ($a_1$)

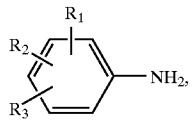

($a_2$)

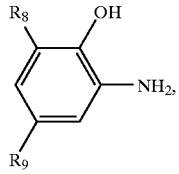

($a_3$)

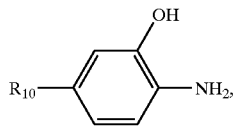

($a_4$)

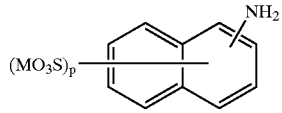

($a_5$)

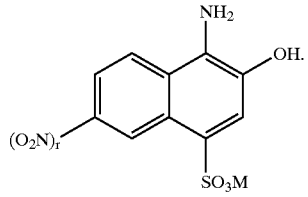

wherein $R_1$ signifies hydrogen, nitril, trifluoromethyl, nitro, $—SO_3M$, $—SO_2NR_4R_5$, —COOM or $—CONR_4R_5$, $R_2$ signifies hydrogen, nitro, $—SO_3M$, $—SO_2NR_4R_5$, trifluoromethyl, nitril, —COOM, $—CONR_4R_5$, $C_{1-4}$-alkyl, $C_{1-4}$-alkoxy, halogen or $C_{1-2}$-mercaptoalkyl, $R_3$ signifies hydrogen, $C_{1-4}$-alkyl, $C_{1-4}$-alkoxy, halogen, $C_{1-2}$-mercaptoalkyl, —NH—Ac, —NH—CO—O—$CH_3$ or a radical of formula (a')

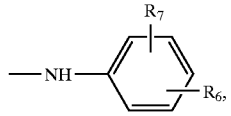

$R_4$ signifies hydrogen, $C_{1-4}$-alkyl, $C_{1-3}$-alkylene-R' or $C_{2-3}$-3-hydroxyalkyl, $R_5$ signifies hydrogen, $C_{1-4}$-alkyl, $C_{1-3}$-alkylene-R', $C_{2-3}$-hydroxyalkyl, benzyl or a radical of formula (a")

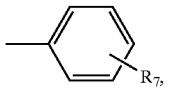

R' signifies nitril, carbamoyl or —COOM, $R_6$ signifies hydrogen, nitro or —$SO_3M$, $R_7$ signifies hydrogen, methyl, chlorine, nitro, —COOM or —$SO_3M$, $R_8$ signifies hydrogen, halogen, nitro, —$SO_3M$, —$SO_2NR_4R_5$, methylsulphonyl, $C_{1-4}$-alkyl or —NH—Ac, $R_9$ signifies hydrogen, halogen, nitro, —$SO_3M$, —$SO_2NR_4R_5$, methylsulphonyl, $C_{1-4}$-alkyl or —NH—Ac, $R_{10}$ signifies nitro, —$SO_3M$ or —$SO_2NR_4R_5$, Ac signifies an aliphatic acyl group, p signifies 0 or 1 and r signifies 0 or 1, $R_1$ preferably signifies hydrogen or —COOM.

Of the alkyl and alkoxy groups with 1 to 4 carbon atoms, the lower molecular ones are preferred, in particular ethyl, methyl, ethoxy and methoxy. Halogen may in particular be fluorine, chlorine or bromine of which fluorine and, before all, chlorine are preferred.

Where in formula ($a_1$) $R_3$ signifies a radical of formula (a') this is preferably in para-position to the amino group, $R_1$ preferably signifies hydrogen, $R_2$ preferably signifies hydrogen or a sulpho group and, if $R_2$ signifies a sulpho group, this is preferably in meta-position to the azo group and $R_6$ and $R_7$ preferably signify both hydrogen or, if $R_2$ signifies hydrogen, $R_6$ signifies preferably a nitro group and $R_7$ signifies preferably a carboxy group or a sulpho group, the two substituents $R_6$ and $R_7$ being placed in the para-position to the imino group and in one of the two ortho-positions to the imino group.

Where the symbol $R_3$ does not signify a radical (a'), $R_3$ preferably signifies hydrogen and $R_1$ preferably signifies hydrogen or —COOM. According to a preferred feature, in this case in formula ($a_1$) one or both of the positions ortho to the primary amino group and, more preferably, also one or both of the positions meta to the primary amino group are unsubstituted. According to a further preferred feature, if $R_1$ signifies —COOM, this is in position ortho or para to the diazotizable primary amino group.

$R_4$ preferably signifies hydrogen.

$R_5$ advantageously signifies hydrogen, methyl, ethyl, hydroxyethyl or a radical of formula (a"), in which $R_7$ preferably signifies hydrogen or carboxy.

The aliphatic acyl group Ac advantageously signifies the radical of a low molecular aliphatic carboxylic acid, preferably of an alkanoic acid with 2 to 4 carbon atoms, more preferably acetyl or propionyl, of which acetyl is preferred.

Most preferably the diazo component of formula ($a_1$) is an aminobenzoic acid, in particular anthranilic or p-aminobenzoic acid.

In formula ($a_2$ ) preferably at least one of $R_8$ and $R_9$ has a significance other than hydrogen, more preferably $R_9$ has a significance other than hydrogen and $R_8$ signifies hydrogen, a nitro group or a sulpho group.

The primary amino group in formula ($a_4$) may be in any of the positions α and β of the naphthalene ring and, if p signifies 1, the sulpho group may be in any of the other available positions, preferably so that at least one vicinal position to the amino group is unsubstituted; e.g. if the amino group is in position 1, the sulpho group is preferably in any of the positions 3 to 8, more preferably 4 to 8, and if the amino group is in the position 2, the sulpho group is e.g. in position 1 or in any of the positions 4 to 8, more preferably 5, 6 r 7. A preferred diazocomponent of formula ($a_4$) is naphthionic acid.

The compounds ($a_5$) are indicated in the free amino form, as diazo components they are however usually employed directly in the form of the respective commercially available diazonium compounds 1-diazonium-2-naphthol-4-sulphonic acid (in which r=0) and 1-diazonium-6-nitro-2-naphthol-4-sulphonic acid (in which r=1).

Among the above diazo components are preferred those, which do not contain a hydroxy group in ortho position to the diazotizable amino group, in particular the compounds of formula ($a_1$) and ($a_4$).

Preferably D—$NH_2$ contains at least one hydrophilic substituent, preferably a substituent selected from the group consisting of —$SO_3M$, —$SO_2NR_4R_5$, —COOM and —$CONR_4R_5$, more preferably not more than one hydrophilic substituent per homocyclic aromatic nucleus.

As a middle component there is understood a compound that acts as a coupling component and that contains a diazotizable primary amino group or a group convertible to a diazotizable primary amino group and which compound, upon having been coupled with a diazo compound, if required after having converted a substituent convertible to a primary amino group to this primary amino group, is diazotized and the obtained azodiazocompound is then coupled to a further coupling component. As middle components, from which $W_1$ derives, come preferably into consideration middle components containing a primary amino group.

The radical $W_2$ and respectively the middle component of formula (IX), from which the radical $W_2$ derives, contains two rings of aromatic character, of which one is a benzene ring and the other may be an optionally condensed second benzene ring (to give a naphthalene radical) or a benzene ring linked over a bridging group or a heterocyclic ring linked to the benzene ring, optionally over a heteroatomic bridging group. The diazotizable primary amino group is suitably a substituent of a benzene ring and the coupling position is suitably activated by at least one electron donor substituent, in particular by an amino group or preferably a hydroxy group. The middle component of formula (IX) preferably is a compound of the aminonaphthalene series (more preferably of the aminonaphthole series), of the 1-(aminophenyl)-5-pyrazolone or -5-aminopyrazol series or of the sulphanilylamino-phenol or -pyrimidone series. Where the middle component is of the pyrazole series, it is preferably a pyrazolone in which the 3-position may be substituted with carboxy or $C_{1-4}$-alkyl, preferably methyl, and where the primary amino group at the 1-positioned phenyl radical is in meta- or para-position to the pyrazole radical. Where the middle component is of the sulphanilylaminophenol series, the phenolic hydroxy group is preferably in meta-position and the two benzene rings preferably do not contain any further substituents. Where the middle component is of the sulphanilylaminopyrimidine series, this is e.g. a middle component as described in GB-A 2 276 174, among which 6-amino-2-sulphanilylamino-3-H-pyrimidin-4-one and 2-sulphanilylamino-3-H-pyrimidine-4,6-dione are preferred. Among the aminonaphthols are preferred those containing two or preferably only one sulpho group, more particularly H-acid, J-acid and γ-acid (the latter being particularly preferred).

$B_1$ or $B_2$ may be the radical of any coupling component H—$B_1$ or H—$B_2$ which may, in particular, be of the benzene, naphthalene, heterocyclic or open-chain methylene-active series, and suitably contains at least one substituent that activates the compound H—$B_1$ or H—$B_2$ or coupling, in particular an aromatically bound or enolic, optionally etherified hydroxy group or an optionally substituted amino group, so that the coupling reaction may take place in the corresponding activated position of the molecule H—$B_1$ or H—$B_2$.

Suitable coupling components H—$B_1$ or H—$B_2$ are, in particular, those of the following formulae (b1)

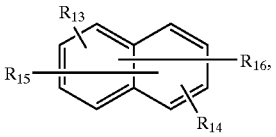

(b2)

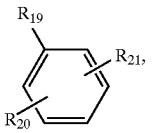

(b3)

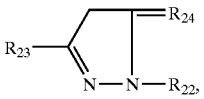

(b4)

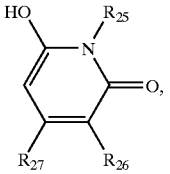

(b5)

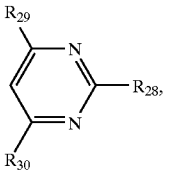

(b6)

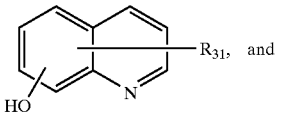

(b7)

wherein $R_{13}$ signifies hydrogen, —$OR_{17}$ or $NHR_{17}$, $R_{14}$ signifies —$OR_{17}$ or —$NHR_{17}$, $R_{15}$ signifies hydrogen, —$SO_3M$, —$SO_2NR_4R_5$, —COOM or —$CONR_4R_5$.

$R_{16}$ signifies hydrogen, —$SO_3M$, —$SO_2NR_4R_5$, —COOM or —$CONR_4R_5$, $R_{17}$ signifies hydrogen, $C_{1-4}$-hydrogen, $C_{1-4}$-alkyl, Ac' or a radical of formula (b')

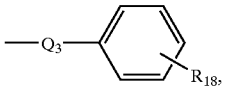

Ac' signifies the acyl radical of an aliphatic carboxylic acid, $Q_3$ signifies —CO—, —$SO_2$— or the direct bond, $R_{18}$ signifies hydrogen, methyl, —NH—Ac, —COOM or —$NO_2$ or, if in formula (b') $Q_3$ signifies —CO— or —$SO_2$—, also —$NH_2$, $R_{19}$ signifies —OH or —$NH_2$, $R_{20}$ signifies hydrogen, $C_{1-4}$-alkyl, $C_{1-4}$-alkoxy, —OH, —NR"R"' or —NH—Ac, $R_{21}$ signifies hydrogen, $C_{1-4}$-alkyl or $C_{1-4}$-alkoxy, R" and R"' independently, signify hydrogen, $C_{1-2}$-alkyl or $C_{2-3}$-hydroxy-alkyl, $R_{22}$ signifies hydrogen, sulphonaphthyl or a radical of formula (b")

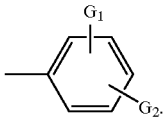

$G_1$ signifies hydrogen, halogen, methyl, methoxy or —COOM, $G_2$ signifies hydrogen, halogen, trifluoromethyl, nitril, nitro, —COOM, —$SO_3M$ or —$SO_2NR_4R_5$, $R_{23}$ signifies $C_{1-4}$-alkyl, phenyl, —COOM, —$CONR_4R_5$, —$COOCH_3$ or —$COOC_2H_5$, $R_{24}$ signifies =O or =NH, $R_{25}$ signifies hydrogen, unsubstituted amino, phenylamino, sulphonaphthyl, open-chain $C_{1-8}$-alkyl, $C_{6-9}$-cycloalkyl, carboxy-($C_{1-4}$-alkyl), $C_{2-4}$-alkyl substituted with hydroxy, methoxy, ethoxy or a sulpho group in one of the positions β to ω, or a radical of formula (b"), $R_{26}$ signifies hydrogen, nitril, acetyl, —COOM, carbamoyl, —$SO_3M$, pyridinio or 2-methyl-pyridinio, $R_{27}$ signifies hydrogen, hydroxy, methyl, carboxy, phenyl, sulphomethyl or carbamoyl, $R_{28}$ signifies hydroxy, primary amino, nitrilamino, thiol or a radical of formula (b"')

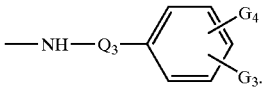

$R_{29}$ signifies hydroxy or primary amino, $R_{30}$ signifies hydroxy or primary amino, $R_{31}$ signifies hydrogen, methyl, chlorine, chloromethyl or chloroacetyl, T signifies —O—, —NH— or the direct bond, $R_{32}$ signifies naphthyl, sulphonaphthyl, disulphonaphthyl or a radical of formula (b"), $R_{33}$ signifies $C_{1-4}$-alkyl, $G_3$ signifies hydrogen, hydroxy, $C_{1-4}$-alkoxy, —NHAc, —$NH_2$, di-($C_{1-4}$-alkyl)-amino or carboxymethylamino, and $G_4$ signifies hydrogen or methyl, and, where in formula ($b_4$) $R_{26}$ stands for pyridinio or orthomethylpyridinio, any carboxy or sulpho group present in the molecule may be in the form of the anion —$SO_3$— or —COO— to form the counter ion in the form of the inner salt.

The aliphatic acyl radical Ac' in the significance of $R_{17}$ may be the radical of any aliphatic carboxylic acid as can be introduced by acylation, in particular of a $C_{2-12}$-alkanoic primary monocarboxylic acid, preferably such as stated above for Ac, especially $C_{2-4}$-alkanoyl, most preferably acetyl.

If $R_{18}$ signifies —COOM, $Q_3$ in formula (b') signifies in particular —CO—. If in formula (b') $Q_3$ signifies the direct bond, $R_{18}$ preferably signifies hydrogen. If in formula (b') $Q_3$ signifies —$SO_2$—, $R_{18}$ preferably signifies methyl, acetylamino or —$NH_2$. If in formula (b') $Q_3$ signifies —CO—, $R_{18}$ preferably signifies hydrogen or —$NO_2$.

In formula ($b_1$) —$OR_{17}$ preferably signifies hydroxy and —$NHR_{17}$ preferably signifies —$NHR_{17}$', where $R_{17}$' signifies hydrogen, methyl, acetyl or a radical of formula (b'). Preferably $R_{14}$ signifies hydroxy or —$NHR_{17}$' and $R_{13}$ signifies hydrogen or, where $R_{14}$ signifies —OH, also a group —$NHR_{17}$'. More preferably either $R_{14}$ signifies hydroxy and $R_{13}$ signifies hydrogen or —$NHR_{17}$ or $R_{14}$ signifies —$NHR_{17}$' and $R_{13}$ signifies hydrogen, $R_{15}$ preferably signifies hydrogen, —$SO_3M$, —COOM or —$CONH_2$. $R_{16}$ preferably signifies hydrogen or —$SO_3M$, more preferably hydrogen. Preferred coupling components of formula ($b_1$) are those in which $R_{13}$, $R_{15}$ and $R_{16}$ signify hydrogen and, in particular, $R_{14}$ signifies hydroxy. Most preferably ($b_1$) is β-naphthol.

If in formula ($b_2$) $R_{20}$ signifies hydroxy, —NR"R'" or —NH—Ac, it is preferably in meta-position to $R_{19}$ and $R_{21}$ preferably signifies hydrogen. If $R_{20}$ signifies $C_{1-4}$-alkyl or $C_{1-4}$-alkoxy it may be in any of the available positions ortho, meta and para to $R_{19}$. More preferably $R_{19}$ signifies hydroxy. Advantageously $R_{21}$, signifies hydrogen.

Of the alkyl and alkoxy radicals with 1 to 4 carbon atoms, also in H—$B_1$ or H—$B_2$ the lower molecular ones are preferred (analogously as in D—$NH_2$), more specifically ethyl, methyl, ethoxy and methoxy. In the $C_{2-3}$-hydroxyalkyl radicals the hydroxy group is preferably in βposition.

In formula ($b_3$) $R_{22}$ preferably signifies a radical of formula (b"). In formula (b")—in the significance of $R_{22}$—preferably at least one of $G_1$ and $G_2$ signifies hydrogen, more preferably $G_1$. $R_{23}$ preferably signifies $C_{1-4}$-alkyl, more preferably methyl. $R_{24}$ preferably signifies oxygen.

The open-chain $C_{3-8}$-alkyl radicals in the significance of $R_{25}$ may be linear or branched, if they contain 6 to 8 carbon atoms they are preferably branched; the cycloalkyl radicals in the significance of $R_{25}$ are preferably cyclohexyl, which may be substituted with 1 to 3 methyl groups, more preferably it is unsubstituted cyclohexyl. The carboxy-substituted $C_{1-4}$-alkyl group preferably is carboxymethyl or β-carboxyethyl. The substituent (hydroxy, methoxy, ethoxy, sulpho) at the $C_{2-4}$-alkyl, in the significance of $R_{25}$, is preferably in β-position. If $R_{25}$ signifies a radical of formula (b") $G_1$ preferably signifies hydrogen and $G_2$ preferably signifies carboxy, sulpho or trifluoromethyl. Preferred significances of $R_{25}$ are hydrogen, a radical of formula (b"), $C_{1-8}$-alkyl, $C_{2-3}$-hydroxyalkyl and $C_{6-9}$-cycloalkyl.

$R_{26}$ preferably signifies hydrogen, a sulpho group or one of the stated nitrogen-containing substituents.

$R_{27}$ preferably has a significance other than hydrogen, more preferably methyl.

In formula ($b_5$) preferably at least one of $R_{29}$ and $R_{30}$ signifies hydroxy, more preferably both $R_{29}$ and $R_{30}$ signify hydroxy groups.

If in formula ($b_5$) $R_{28}$ signifies a radical of formula (b"'), —NH—$Q_3$— preferably signifies a group —NH—$SO_2$—.

In formula ($b_6$) the hydroxy group preferably is in position 8. If $R_{31}$ is other than hydrogen it is preferably in position para to the 8-positioned hydroxy group. $R_{31}$ preferably signifies hydrogen or methyl, more preferably hydrogen.

In formula ($b_7$) T preferably signifies —NH—. More preferably $R_{32}$ is unsubstituted phenyl and $R_{33}$ is preferably methyl.

The coupling component radical —$B_1$ or —$B_2$ preferably contains up to three cycles (homocyclic rings, heterocyclic rings and optionally a cycloaliphatic ring—a naphthalene radical being calculated as two cycles), more preferably —$B_1$ or —$B_2$ contain each one or two of such cycles.

The coupling components H—$B_1$ and H—$B_2$ preferably correspond to formula ($b_1$), ($b_2$), ($b_3$) and/or ($b_7$) or are preferably mixtures of ($b_1$) with one of ($b_2$), ($b_3$) or ($b_7$), e.g. in the molar ratio of 1/9 to 9/1, preferably 3/7 to 7/3.

The bis-diazo component radicals $W_1$ are bicyclic, in particular they contain two benzenic rings linked to each other over a heteroatomic bridge. They derive from corresponding bis-diazo components containing as a substituent at one of the two rings a primary diazotizable amino group and as a substituent at the other benzenic ring a primary diazotizable amino group or a substituent convertible into such a primary amino group, in particular a nitro group reducible to primary amino or an acylated amino group hydrolyzable to primary amino; more preferably this substituent is, however, primary amino. As bis-diazo components from which $W_1$ derives come, in particular, into consideration those of the formula

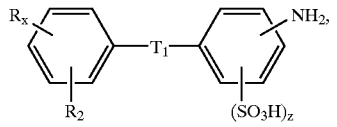

(Aa$_1$)

wherein $T_1$ signifies a heteroatomic bridging member, in particular —$SO_2$—, —CO—, —$SO_2$—NH—, —$SO_2$—NH—$SO_2$—, —CO—NH—, —NH—CO—NH—, —S—, —O—, —NH—, or a methylene bridge.

$R_x$ signifies primary amino, acetylamino or nitro, and z signifies 0 or 1.

In formula (Aa$_1$) $R_x$ preferably signifies primary amino.

$T_1$ preferably signifies —$SO_2$NH—, —CO—NH—, —NH— or —$SO_2$NH—$SO_2$—, among which —NH— and especially —$SO_2$—NH— are particularly preferred.

$R_2$ in formula (Aa$_1$) preferably signifies hydrogen.

Where $T_1$ signifies —NH— z preferably signifies 1. Where $T_1$ signifies —CO—NH— or —$SO_2$—NH— the —NH— group thereof is preferably linked to the benzenic ring bearing the substituent $R_x$. Where $T_1$ signifies a bridging group containing a —$SO_2$— or —CO— group z preferably signifies 0.

The substituent $R_x$, in particular the primary amino group, may be in position meta, or preferably, para to $T_1$.

The compounds of formula (VI) preferably correspond to the above formula (Aa$_1$) wherein $R_x$ signifies primary amino, which is more preferably in para position to $T_1$.

In formula (II) $Q_1$ preferably signifies —$SO_2$—; $Q_2$ preferably signifies the direct bond.

Among the tetrakisazo dyes of the invention are preferred those in which Z signifies a radical of formula (α), especially those of formula (Ib), and particularly preferred are also their mixures with trisazo dyes of formula (X).

The diazotization and coupling reactions may be carried out in a manner conventional per se. Diazotization may e.g. be carried out with a nitrite (preferably sodium nitrite) in acidic aqueous medium (preferably in the presence of hydrochloric acid) and at low temperatures, e.g. in the range of −5° C. to +10° C., preferably 0 to 5° C. The coupling reaction of the diazonium compounds to the respective coupling components is advantageously carried out at temperatures in the range of −5° C. to +30° C., preferably below 25° C., more preferably in the range of 0 to 10° C. The coupling of the diazo compound of an amine of formula (VIII) to a middle component of formula (IX) may be carried out under distinctly acidic to strongly basic pH-conditions, e.g. at a pH in the range of 4 to 12, preferably 5 to 11. The selective coupling of a bisdiazo compound of a diamine of formula (II) or (VI) at one side to the 3-position of a compound of formula (III) is suitably carried out under distinctly acidic conditions, e.g. at a pH in the range of 1 to 5, preferably by adding an aqueous solution of a compound of formula (III) of a nearly neutral pH (e.g. pH in the range of 6 to 8, preferably 6.5 to 7.5) into the acidic solution, in which the diazotization has been carried out and that contains the diazonium compound.

The coupling of the monoazodiazo compound to a coupling component H—$B_1$ or H—$B_2$ may be carried out at any pH as suitable for coupling to the respective coupling component, preferably at pH values below 10, in particular in the range of 4 to 8.5, more preferably under nearly neutral conditions, in particular at pH-values in the range of 6 to 7.5 and at temperatures, e.g. in the range of −5° C. to +30° C., preferably 0 to 25° C. The coupling of a diazo compound of an amine of formula (V) to the 6-position of a compound of formula (IV) is preferably carried out under mildly basic to nearly neutral pH-conditions, e.g. at a pH in the range of 6 to 9, preferably 6.5 to 8 and under temperatures preferably in the range of 0 to 25° C. These pH and temperature conditions are also suitable for the selective coupling of the bisdiazocompound of a bisamine of formula (II) or (VI) at one side to the 6-position of a disazo compound of formula (VII). The coupling of the trisazodiazocompound to a coupling component H—$B_1$ or H—$B_2$ may be carried under conditions as described above for the coupling of the monoazodiazo compound. By using a suitable base for pH-adjustment (preferably alkali metal hydroxide, e.g. sodium hydroxide or potassium hydroxide, more preferably sodium hydroxide), the dyes may be obtained in a suitable salt form of high hydrosolubility. If desired, they may be obtained in another salt form, e.g. by precipitation by means of acidification and then conversion to another salt form by addition of a suitable base.

The synthetized dyes may be purified, if desired, in any manner conventional per se, e.g. by precipitation (e.g. by salting out or by acidification with a strong mineral acid) and filtration and optionally re-precipitation and filtration, and/or by microfiltration and, optionally, ultra-filtration. Where desired, the dye solution may be further purified and/or concentrated by means of suitable membrane filtrations. The purified dye solutions may be dried to dye-powder or -granulate.

The dye may, upon isolation or dialysis, be blended with suitable blending agents conventional per se, e.g. alkali metal salts (sodium carbonate, sodium sulphate) non-electrolyte blending agents (mainly oligosaccharides, e.g. dextrine) or/and with surfactants (e.g. as suitable as wetting agents), in particular non-ionic and/or anionic surfactants. There may e.g. be mentioned hydrocarbon sulphonates, sulphonated castor oil, sulphosuccinates, lignin sulphonate, hydrophilic polysaccharide derivatives, ethoxylated alkylphenols or fatty alcohols. If a surfactant is employed the weight ratio of the surfactant to the dye is advantageously in the range of 5:95 to 40:60. If desired, especially if the composition contains a surfactant, as indicated above, it may be formulated with water as a liquid concentrated dye-composition, preferably with a dry-substance content in the range of 10 to 70%, more preferably 20 to 50% by weight, referred to the weight of the composition.

The dyes of the invention are, in general, of dark hues, in particular ranging from green to red hues, e.g. bluish black, reddish black or greenish black, and/or deep black.

The tetrakisazo dyes of the invention are anionic dyes and are suitable for dyeing substrates dyeable with anionic dyes.

Any substrate that is dyeable with anionic dyes is suitable as a substrate that may be dyed with the azo dyes of the invention; these include natural and regenerated cellulose, polyurethanes, basically modified high polymers (e.g. basically modified polypropylene), natural or synthetic polyamides or anodized aluminium, in particular, however, leather substrates. The substrate to be dyed may be in any conventional form, e.g. in the form of loose fibers, filaments, yarns, woven or knitted goods, non-woven webs, carpets, half-ready-made and ready-made soft goods and tanned leather or pelts. The dyes may be employed in any desired concentration up to the saturation of the substrate. The dyeing may be carried out by any conventional methods that are suitable for the substrate to be dyed, e.g. by exhaustion or impregnation methods (e.g. padding, spraying, foam application or application with a roller, or printing), preferably from aqueous medium; for synthetic substrates, the dye may optionally also be incorporated into the synthetic mass. Paper may be dyed in the pulp, or after sheet formation.

The dyes of the invention are, however, mainly suitable for the dyeing of leather and pelts.

Any kinds of leather which are conventionally dyed from aqueous medium are suitable, particularly grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents |e.g. chromium, zirconyl or aluminium derivatives, quebracho, chestnut or mimosa extracts, aromatic syntans, polyurethanes, (co) polymers of (meth)acrylic acid compounds or melamine/, dicyanodiamide/and/or urea/formaldehyde resins|. Thus leathers of very high to very low affinity for anionic dyes may be used.

The leathers may be of various thicknesses, thus, there may be used very thin leathers, such as book-binder's leather or glove-leather (nappa), leather of medium thickness, such as shoe upper leather, garment leather and leather for handbags, or also thick leathers, such as shoe-sole leather, furniture leather, leather for suitcases, for belts and for sport articles; hear-bearing leathers and furs may also be used. After tanning (in particular after a re-tanning) and before dyeing, the pH of the leather is advantageously set to values in the range of 4 to 8 (the leather is "neutralized"); depending on the kind of the leather, there may be chosen an optimum pH range, e.g. for grain leather pH values in the range of 4 to 6, for suede leather and split velours and for very thin leathers pH-values in the range of 4.5 to 8, for intermediately dried suede leathers and intermediately dried split velours the pH may range in the scope of 5 to 8. For the adjustment of the pH-value of the leather there may be employed conventional assistants; for tanned leather of acidic character the pH may be adjusted by addition of suitable bases, e.g. ammonia, ammonium bicarbonate or alkali metal salts of weak acids, e.g. sodium formate, sodium acetate, sodium bicarbonate, sodium carbonate or sodium sulphite, of which sodium formate and sodium bicarbonate are preferred. Sodium carbonate and sodium bicarbonate are usable in particular as second bases for the exact adjustment of the superficial pH-value of the leather. Mineral tanned leather may, if desired, also be masked, e.g. with alkali metal formate, oxalate or polyphosphate or e.g. with titanium/potassium oxalate.

The dyeing may be carried out in a manner known per se suitably in an aqueous medium and under conventional temperature and pH conditions, in particular in the temperature range of 20 to 80° C., preferably 25 to 70° C., milder temperature conditions, in particular in the range of 25 to 40° C., being preferred for the achievement of deeper penetrations and for the dyeing of wool-bearing skins and furs. The pH-values of the dye-bath may, in general, range broadly, mainly from pH 8 to pH 3; in general the dyeing may be advantageously begun at higher pH-values and concluded at lower pH-values. Preferably the dyeing is carried out at pH-values $\geqq 4$, in particular in the pH-range of 8 to 4, and for the conclusion of the dyeing procedure the pH-value is lowered (e.g. by addition of an acid conventional in the leather dyeing technique such as acetic acid or formic acid) preferably to values in the range between 4 and 3. The dye concentration may range broadly, if desired, up to the saturation degree of the substrate, e.g. up to 5%, referred to the wet weight of the substrate. The dyeing may be carried out in one or more stages, e.g. in two stages, optionally with insertion of charge reversal of the substrate by means of conventional cationic assistants.

The dyes of the invention may, if desired, be employed in combination with conventional dyeing assistants, mainly non-ionic or anionic products (in particular surfactants, preferably hydrophilic polysaccharide derivatives, polyoxyethylated alkylphenols or alcohols, lignosulphonates or sulpho group-containing aromatic compounds).

A fatting may, if desired, be carried out before and/or after the dyeing process, in particular also in the same liquor. For fatting after the dyeing process the fatting agent is advantageously added before the pH of the liquor is lowered, preferably to values between 3 and 4.

For the fatting (in particular fat-liquoring) step there may be used any conventional natural animal, vegetable or mineral fat, fat oil or wax, or chemically modified animal or vegetable fat or oil, which include in particular tallow, fish oils, neats-foot oil, olive oil, castor oil, rapeseed oil, cottonseed oil, sesame oil, corn oil and Japanese tallow, and chemically modified products thereof (e.g. hydrolysis, transesterification, oxidation, hydrogenation or sulphonation products), bees-wax, Chinese wax, carnauba wax, montan wax, wool fat, birch oil, mineral oils with boiling range within 300 and 370° C. (particularly the so-called "heavy alkylates"), soft paraffin, medium paraffin, vaseline and methyl esters of $C_{14-22}$-fatty acids; and synthetic leather fatting agents, including esters, in particular partial esters of polybasic acids (e.g. phosphoric acid) with optionally oxyethylated fatty alcohols. Of the above mentioned the methyl ester, the sulphonation products and the phosphoric acid partial esters are particularly preferred. By the term "sulphonation" for the fatting agents, there is meant generally the introduction of the sulpho group including also the formation of a sulphato group (="sulphating") and the introduction of a sulpho group by reaction with a sulphite or $SO_2$ (="sulphiting").

A conventional leather softener, in particular a cationic leather softener may, if desired, be applied in a final step, particularly if fatting has been carried out with a sulphonated fat-liquoring agent.

The treated substrate may then be further treated in conventional manner, e.g. rinsed or washed, drained, dried and cured.

According to the invention there may be obtained azodyes that display, even with a relatively low number of hydrosolubilizing substituents in $W_1$, $W_2$, D, $B_1$ or $B_2$, a high solubility in water, especially where the anionic dyes are in alkali metal salt form; they are distinguished by their stability to electrolytes (in particular inorganic ions), specifically also to bases and acids, and are also distinguished, especially on leather, by their build-up and a high degree of insensitivity to variations of the affinity of the leather towards anionic dyes, very level dyeings of outstanding penetration and high colour-yield being obtainable. In these leather-dyeing properties the dyes of formulae (Ic) and especially (Ib) excel over those of formula (Ia) and are, thus, preferred. According to a particular feature of the invention and with a view to these properties, they may advantageously be employed also in a form substantially free of other elektrolytes, as obtainable by dialysis.

The dyeings, particularly on leather, have excellent fastness properties, for example wet-fastnesses, fastness to rubbing, light-fastness and stability to PVC-migration. They are readily combinable with other dyes, in particular such with similar tinctorial behavior. There may be obtained very level, intense, fine dyeings, grain side and velours side being very evenly dyed, the shade of the dyeings on different kinds of leather being equal or very similar; in admixture with corresponding compatible dyes with which the dyes of the invention are combinable, in particular with the above trisazo dyes of formula (X), there may also be obtained very intense and regular dyeings of high yield and optimum fastnesses. By the choice of the substituents some of the properties of the dyes (e.g. solubility, shade, build-up, penetration, levelness etc.) may be varied accordingly. The polyazodyes of the invention, especially the preferred ones, are also well combinable with trisazo or other tetrakisazo dyes, there being obtainable very homogeneous shades and penetrations and regular dyeings of optimum fastnesses, also light fastness.

In the following Examples parts and percentages are by weight. The temperatures are indicated in degrees Celsius. In the Application Examples the respective dyes are used in blended form containing 30% of the respective dye and the blending agent being Glauber's salt (sodium sulphate), the other products employed in the Application Examples are commercially available products conventional in the treatment of leather.

EXAMPLE 1

13.2 parts of 4-amino-N-(4'-aminophenyl)-benzenesulphonamide are diazotized in conventional way with sodium nitrite in the presence of hydrochloric acid, and 16 parts of H-acid, previously dissolved in water with sodium hydroxide at pH 7, are added thereto. When the coupling reaction is completed the pH is adjusted to 7 by addition of 10 parts of 25% sodium hydroxide solution. Simultaneously 6.9 parts of anthranilic acid are diazotized in conventional way with sodium nitrite in the presence of hydrochloric acid and coupled to 12 parts of γ-acid at pH 9 adjusted with sodium hydroxide; the obtained suspension of monoazocompound is mixed with a solution of 4 parts of sodium nitrite in 20 parts of water and added into a mixture of 25 parts of 30% hydrochloric acid solution and 25 parts of ice. When the diazotization reaction is complete, the obtained suspension is added into the previously prepared monoazodiazocompound suspension, keeping the pH at 7 by addition of 25 parts of 25% sodium hydroxide solution. The coupling reaction is completed after about two hours. Then a solution of 15 parts of β-naphthol in 50 parts of water and 19 parts of 25% sodium hydroxide solution is added within 5 minutes. Finally, the obtained tetrakisazodye is salted out, by addition of sodium chloride, suction filtered, washed and dried. There is obtained 60 parts of a black powder that dyes leather in reddish black shades.

EXAMPLE 2

13.2 parts of 4-amino-N-(4'-aminophenyl)-benzenesulphonamide are diazotized in conventional way with sodium nitrite in the presence of hydrochloric acid and mixed with 16 parts of H-acid, previously dissolved at pH 7 with sodium hydroxide. When the coupling reaction is completed the pH is adjusted to 7 by addition of 10 parts of 25% sodium hydroxide solution. Simultaneously 14 parts of 4,4'-diaminodiphenylamine-2-sulphonic acid is diazotized in conventional way with sodium nitrite in the presence of hydrochloric. The obtained bisdiazocompound suspension is added dropwise into the previously prepared monoazodiazocompound suspension, keeping the pH at 7 by addition of 25 parts of 25% sodium hydroxide solution. The coupling reaction is completed in about 2 hours. Then a solution of 8 parts of β-naphthol in 25 parts of water and 13 parts of 25% sodium hydroxide solution is added thereto during 5 minutes. Finally the dye is salted out with sodium chloride, suction filtered, washed and dried. There is obtained 60 parts of a black powder that dyes leather in reddish black shades.

EXAMPLE 3

The procedure described in Example 1 is repeated, with the difference that, in place of β-naphthol, there is employed the equivalent amount of acetoacetanilide. There is obtained a black powder that dyes leather in bluish black shades.

EXAMPLE 4

The procedure described in Example 1 is repeated, with the difference that, in place of β-naphthol, there is employed the equivalent amount of 1-phenyl-3-methyl-5-pyrazolone. There is obtained a black powder that dyes leather in greenish black shades.

EXAMPLE 5

The procedure described in Example 1 is repeated with the difference that, in place of anthranilic acid, there is employed the equivalent amount of naphthionic acid. There is obtained a black powder that dyes leather in reddish black shades.

EXAMPLE 6

The procedure described in Example 5 is repeated with the difference that, in place of β-naphthol, there is employed the equivalent amount of acetoacetanilide. There is obtained a black powder that dyes leather in bluish black shades.

EXAMPLE 7

The procedure described in Example 5 is repeated with the difference that, in place of β-naphthol, there is employed the equivalent amount of 1-phenyl-3-methyl-5-pyrazolone. There is obtained a black powder that dyes leather in greenish black shades.

EXAMPLE 8

The procedure described in Example 2 is repeated with the difference that the 4,4'-diaminodiphenylamine-2-sulphonic acid is replaced by the equivalent amount of 4-amino-N-(4'-aminophenyl)-benzenesulphonamide. There is obtained a black powder that dyes leather in reddish black shades.

EXAMPLE 9

The procedure described in Example 2 is repeated with the difference that the β-naphthol is replaced by a mixture of equimolar quantities of β-naphthol and 1-phenyl-3-methyl-5-pyrazolone. There is obtained a black powder that dyes leather in deep black.

EXAMPLE 10

The procedure described in Example 2 is repeated with the difference that the employed quantity of β-naphthol is replaced by the equivalent amount of a mixture of equimolar parts of β-naphthol and acetoacetanilide. There is obtained a black powder that dyes leather in reddish black shades.

EXAMPLE 11

The procedure described in Example 2 is repeated with the difference that the β-naphthol is replaced by the equivalent amount of 1-phenyl-3-methyl-5-pyrazolone. There is obtained a black powder that dyes leather in greenish black shades.

EXAMPLE 12

The procedure described in Example 2 is repeated with the difference that the β-naphthol is replaced by the equivalent amount of acetoacetanilide. There is obtained a black powder that dyes leather in greenish black shades.

EXAMPLE 13

13.2 parts of 4-amino-N-(4'-aminophenyl)-benzenesulphonamide are diazotized in conventional way with sodium nitrite in the presence of hydrochloric acid and mixed with 16 parts of H-acid, previously dissolved at pH 7 with sodium hydroxide. When the coupling reaction is completed the pH is adjusted to 7 by addition of 10 parts of 25% sodium hydroxide solution. Simultaneously 7 parts of 4,4'-diaminodiphenylamine-2-sulphonic acid and 3.4 parts of p-aminobenzoic acid are diazotized in conventional way with sodium nitrite in the presence of hydrochloric acid. The obtained suspension of the mixture of bisdiazocompound and diazocompound is added dropwise into the previously prepared monoazodiazocompound suspension, keeping the pH at 7 by addition of 25 parts of 25% sodium hydroxide solution. The coupling reaction is completed in about 2 hours. Then a solution of 11 parts of β-naphthol in 25 parts of water and 13 parts of 25% sodium hydroxide solution is added thereto during 5 minutes. Finally the dye is salted out with sodium chloride, suction filtered, washed and dried. There is obtained 60 parts of a black powder that dyes leather in reddish black shades.

EXAMPLE 14

The procedure described in Example 13 is repeated, with the difference that, in place of β-naphthol, there is employed the equivalent amount of acetoacetanilide. There is obtained a black powder that dyes leather in greenish black shades.

EXAMPLE 15

The procedure described in Example 13 is repeated with the difference that, in place of β-naphthol, there is employed the equivalent amount of 1-phenyl-3-methyl-5-pyrazolone. There is obtained a black powder that dyes leather in greenish black shades.

EXAMPLE 16

The procedure described in Example 13 is repeated with the difference that, in place of β-naphthol, there is employed the equivalent amount of m-aminophenol. There is obtained a black powder that dyes leather in greenish black shades.

EXAMPLE 17

The procedure described in Example 13 is repeated with the difference that the β-naphthol is replaced by the equivalent amount of a mixture of equimolar quantities of β-naphthol and acetoacetanilide. There is obtained a black powder that dyes leather in deep black.

EXAMPLE 18

The procedure described in Example 13 is repeated with the difference that the β-naphthol is replaced by the equivalent amount of a mixture of β-naphthol and m-aminophenol in the molar ratio of 75 mol-% of β-naphthol and 25 mol-% of m-aminophenol. There is obtained a black powder that dyes leather in deep black.

EXAMPLE 19

The procedure described in Example 13 is repeated with the difference that the β-naphthol is replaced by the equivalent amount of a mixture of equimolar quantities of β-naphthol and 1-phenyl-3-methyl-5-pyrazolone. There is obtained a black powder that dyes leather in deep black.

APPLICATION EXAMPLE A 100 parts of an intermediately dried chrome-tanned suede split leather are wetted back with 800 parts of water at 50° C., 2 parts of 25% ammonia solution and 0.5 parts of the adduct of 10 moles of ethylene oxide to 1 mol of nonylphenol for 90 minutes; the bath is then drained off and 600 parts of water at 50° C., 1 part of a 25% ammonia solution and 1 part of a fat-liquoring agent (an emulsion of fatty acid esters) are added. After 10 minutes, 4 parts of the dye produced according to Example 1, previously dissolved in 400 parts of water of 50° C., are added for pre-dyeing. After 60 minutes, 2 parts of an 85% formic acid are added and drumming is continued for 20 minutes. 2 parts of a 20% solution of the product obtained by quaternization with dimethylsulphate of the benzylation product of diethylenetriamine are then added and after 20 minutes 2 parts of the same dyestuff as used for pre-dyeing, previously dissolved in 200 parts of water of 50° C., are added. Drumming is continued for 40 minutes, then the bath is acidified with two additions of 1.5 parts of an 85% formic acid solution at an interval of 10 minutes between the two additions. After 10 minutes the bath is drained off and the leather is rinsed, drained, dried and cured as usual. There is obtained a leather dyed in a deep reddish black shade with outstanding fastnesses (in particular wet fastnesses, fastness to dry cleaning, fastness to light and PVC-migration resistance).

APPLICATION EXAMPLE B 100 parts of chrome-tanned bovine upholstery leather are wetted back with 800 parts of water, 2 parts of 25% ammonia solution and 3 parts of the adduct of 10 moles of ethylene oxide to 1 mol of nonylphenol at 50° C. during 90 minutes. The bath is then drained off and the leather is treated for 15 minutes with 400 parts of water at 40° C., 1.5 parts of a 25% ammonia solution, 2 parts of a fat-liquoring agent (an emulsion of fatty acid esters) and 1 part of a phenolic syntan (condensation product of phenol and sulphuric acid). 6 parts of the dye obtained in Example 1, previously dissolved in 600 parts of water of 50° C., are added and drumming is continued for 60 minutes. The bath is then acidified with two subsequent addition of 1.5 parts of an 85% formic acid solution, at an interval of 10 minutes. After 10 minutes the leather is rinsed, drained, dried and cured as conventional. There is obtained a leather dyed in a deep reddish black shade with outstanding fastnesses (in particular wet fastnesses, fastness to dry cleaning, fastness to light and PVC-migration resistance).

APPLICATION EXAMPLE C 100 parts of chrome tanned bovine upholstery leather is wetted back with 800 parts of water, 2 parts of 25% ammonia solution and 3 parts of the adduct of 10 moles of ethylene oxide to 1 mol of nonylphenol at 50° C. during 90 minutes. The liquor is then drained off and the leather is treated for 15 minutes with 400 parts of water at 40° C., 1.5 parts of a 25% ammonia solution, 2 parts of a fat-liquoring agent (an emulsion of fatty acid esters) and 1 part of a phenolic syntan (condensation product of phenol and sulphuric acid). The leather is then pre-dyed with 4 parts of the dye obtained in Example 1, previously dissolved in 400 parts of water of 50° C. After 60 minutes, the bath is acidified with 1 part of an 85% formic acid solution and, after 10 minutes, 2 parts of a 20% solution of the product obtained by quaternization with dimethylsulphate of the benzylation product of diethylenetriamine are added. The bath is drained off after 20 minutes and the leather is rinsed, dyed at 50° C. with 400 parts of water and 2 parts of the same dyestuff as used before pre-dyeing, previously dissolved in 200 parts of water of 50° C., for 40 minutes. The bath is then acidified with 1 part of an 85% formic acid solution and, after 20 minutes, the leather is rinsed, drained, dried and cured as conventional. There is obtained a leather dyed in a reddish black shade with outstanding fastnesses (in particular wet fastnesses, fastness to dry cleaning, fastness to light and PVC-migration resistance).

APPLICATION EXAMPLE D 100 parts of low affinity chrome/vegetable tanned bovine leather is wetted back at 50° C. with 1000 parts of water and 0.2 parts of the adduct of 10 moles of ethylene oxide to 1 mol of nonylphenol during 90 minutes. The bath is then drained off and the leather is dyed at 50° C. with 1000 parts of water and 4 parts of the dye obtained in Example 1, previously dissolved in 400 parts of water of 50° C. After 1 hour, the bath is acidified with 2 parts of an 85% formic acid solution, and, after 20 minutes, the leather is rinsed, drained, dried and cured as conventional. There is obtained a leather dyed in a reddish black shade with outstanding fastnesses (in particular wet fastnesses, fastness to dry cleaning, fastness to light and PVC-migration resistance).

APPLICATION EXAMPLE E 100 parts of semichrome sheep leather are wetted back at 45° C. with 1000 parts of water and 0.5 parts of an amphoteric masking agent (a sulpho group containing fatty acid aminoamide) for 1 hour. The leather is pre-dyed with 800 parts of water of 50° C. and 6 parts of the dye obtained in Example 1, previously dissolved in 600 parts of water of 50° C. Drumming is continued until the dye has penetrated inside the leather. The bath is then acidified with 1.5 parts of an 85% formic acid solution and, after 20 minutes, 2 parts of a 20% solution of the product obtained by quaternization with dimethylsulphate of the benzylation product of diethylenetriamine are added. After 20 minutes the leather is dyed with 6 parts of the same dye as used for pre-dyeing, previously dissolved in 600 parts of water of 50° C., for 40 minutes. The bath is then acidified with 2 parts of an 85% formic acid solution and after 30 minutes the leather is rinsed, drained, dried and cured as conventional. There is obtained a leather dyed in a deep reddish black shade with outstanding fastnesses (in particular wet fastnesses, fastness to dry cleaning, fastness to light and PVC-migration resistance).

Analogously as the yellow dye according to Example 1, the dyes of each of Example 2 to 19 are used in each of the above Application Examples A to E, by which there are also obtained dyeings of corresponding shades, depths and fastnesses.

I claim:

1. A tetrakisazo dye of formula (I)

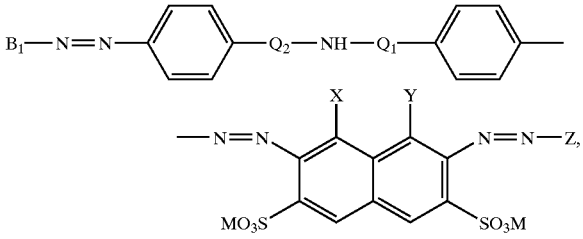

wherein one of the two symbols —X and —Y signifies —OH and the other signifies —$NH_2$, Z signifies a radical of formula $$—W_1—N=N—B_2 \quad (\alpha)$$

or, if Y signifies —OH, also a radical of formula $$—W_2—N=N—D \quad (\beta)$$

$Q_1$ signifies —$SO_2$— or —CO—, $Q_2$ signifies the direct bond or, if $Q_1$ is —$SO_2$—, also a group —$SO_2$—, $B_1$ signifies the radical of a coupling component H—$B_1$, $B_2$ signifies the radical of a coupling component H—$B_2$, D signifies the radical of a diazo component D—$NH_2$, $W_1$ signifies the radical of a bicyclic bisdiazo component, $W_2$ signifies the radical of a bicyclic middle component, [and]

M signifies hydrogen or a cation, *and*

*wherein in formula (I), the radical of formula*

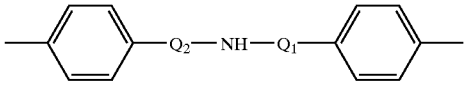

*is the radical of a bisdiazocompound of a diamine of formula (II)*

(II)

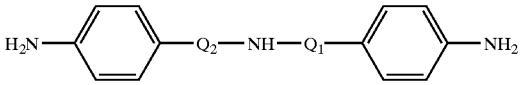

or a mixture of two or more tetrakisazo dyes of formula (I).

2. A dye according to claim 1 of formula (Ia)

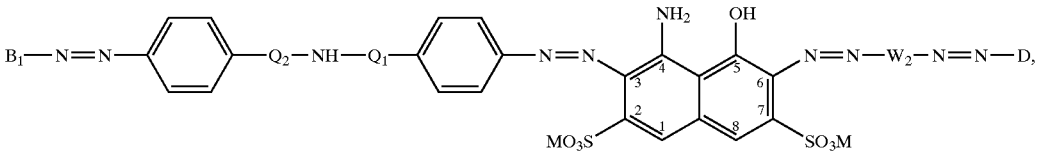

(Ib)

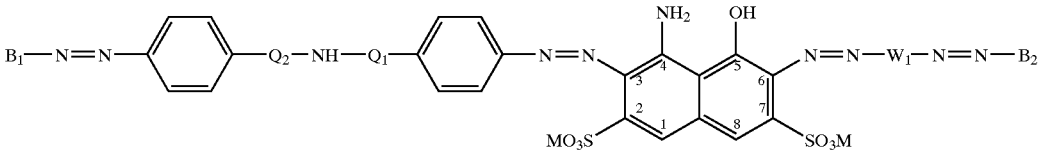

or (Ic)

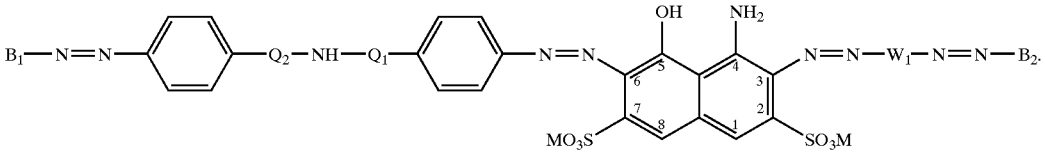

or a mixture of two or more thereof.

3. A process for the production of a tetrakisazo dye according to claim 1 wherein, for the production of a dye of formula (Ia) the bisdiazocompound of a diamine of formula (II)

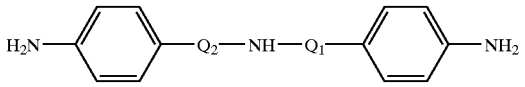

is coupled at one side to the 3-position of a bis-coupling component of formula (III)

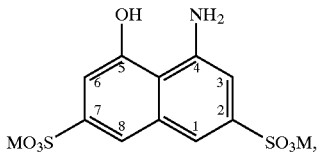

the obtained azodiazocompound is either first coupled to a coupling component H—$B_1$ to give an intermediate of formula (IV)

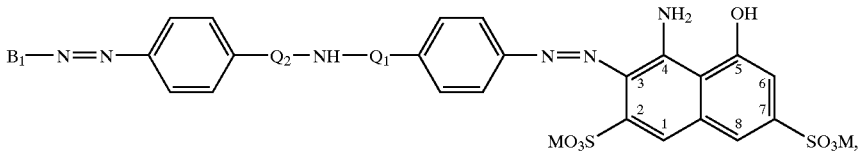

and the diazocompound of an amine of formula $$D—N=N—W_2—NH_2 \quad (V)$$

is coupled to the 6-position of the intermediate of formula (IV), or it is first coupled in the 6-position with the diazocompound of an amine of formula (V) and then coupled to a coupling component H—$B_1$, for the production of a dye of formula (Ib) the bisdiazocompound of a diamine of formula (II) is coupled at one side to the 3-position of a bis-coupling component of formula (III) and the obtained azodiazocompound is either first coupled to a coupling component H—$B_1$ to give an intermediate of formula (IV), and then the bisdiazocompound of a diamine of formula $$H_2N—W_1—NH_2 \quad (VI)$$

is coupled at one side to the 6-position of the intermediate of formula (IV) and the obtained trisazodiazocompound is coupled to a coupling component H—$B_2$, or the azodiazocompound is first coupled in the 6-position with the bisdiazocompound of a diamine of formula (VI) and then the obtained disazobisdiazocompound is coupled to coupling components H—$B_1$ and H—$B_2$, or for the production of a dye of formula (Ic) the bisdiazocompound of a diamine of formula (VI) is coupled at one side to the 3-position of a bis-coupling component of formula (III) and the obtained azodiazocompound is either first coupled to a coupling component H—$B_2$ to give an intermediate of formula (VII)

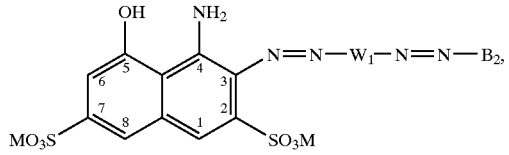

and then the bisdiazocompound of a diamine of formula (II) is coupled at one side to the 6-position of the intermediate of formula (VII) and the obtained trisazodiazocompound is coupled to a coupling component H—$B_1$ or the azodiazocompound is first coupled in the 6-position with the bisdiazocompound of a diamine of formula (II) and then the obtained disazobisdiazocompound is coupled to H—$B_1$ and H—$B_2$.

4. A mixture of at least one dye of formula (1) according to claim 1 and at least one trisazo dye of formula (X)

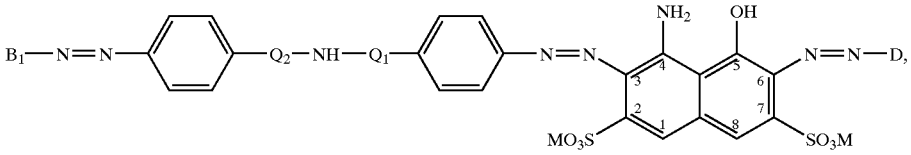

in which $B_1$, D, $Q_1$, $Q_2$ and M have the significances indicated in claim 1.

5. A process for the production of a mixture according to claim 4 of a tetrakisazo dye of the formula:

(Ib)

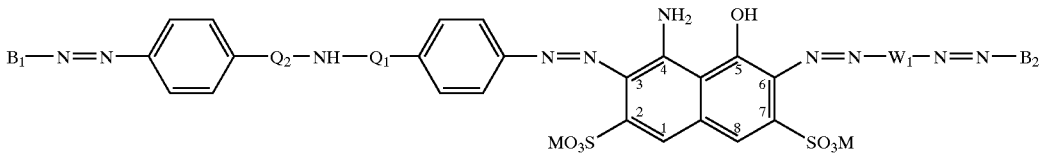

and a trisazo dye of formula (X), wherein the trisazo dyes of formula (X) is synthetized by coupling the diazocompound of a diazocomponent of formula $$D—NH_2 \qquad (VIII)$$

to a compound of formula:

(IV)

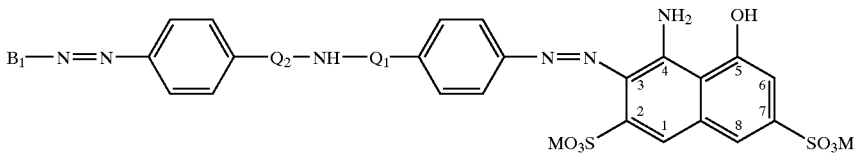

or to its precursor azodiazocompound, before coupling of the diazoazocompound to $H—B_1$, characterized in that for the production of such a mixture in which the starting compounds of formulae:

(II)

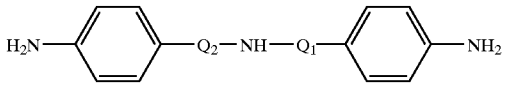

(III)

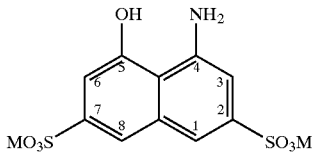

and $H—B_1$ for the production of the trisazo dye of formula (X) are the same as the corresponding ones employed for the production of the tetrakisazo dyes of formula (Ib), this reaction sequence is carried out together with the production of the tetrakisazo dye or dye mixture, choosing the molar ratios in a suitable way.

6. A dye obtainable by the process according to claim 3.

7. A dye mixture obtainable by the process according to claim 5.

8. A dyestuff composition comprising at least one dye according to claim 1.

9. A process according to claim [5] *11* for the dyeing of leather.

10. A dyestuff composition comprising a dye mixture according to claim 4.

11. A process for dyeing substrates dyeable with anionic dyes, comprising the steps of:

providing a substrate dyeable with an anionic dyes;

providing at least one dye according to claim 1; and contacting said substrate with at least one dye according to claim 1.

12. A process for dyeing substrates dyeable with anionic dyes, comprising the steps of:

providing a substrate dyeable with an anionic dye;

providing a dyestuff composition according to claim 8; and contacting said substrate with said dyestuff composition according to claim 8.

13. A dyestuff composition comprising at least one dye according to claim 6.

14. A dyestuff composition comprising at least one dye according to claim 7.

15. A process according to claim 12 for the dyeing of leather.

* * * * *